United States Patent [19]

Hunter

[11] Patent Number: 4,552,527
[45] Date of Patent: Nov. 12, 1985

[54] NOZZLE ASSEMBLY

[75] Inventor: Burnis L. Hunter, Mableton, Ga.

[73] Assignee: Sewell Plastics, Inc., Atlanta, Ga.

[21] Appl. No.: 659,161

[22] Filed: Oct. 9, 1984

[51] Int. Cl.⁴ .......................... B29C 17/07; B29F 5/00
[52] U.S. Cl. ............................... 425/535; 141/311 R; 141/392; 264/512; 264/523
[58] Field of Search ................. 264/39, 348, 512, 523; 141/311 R, 392; 425/522, 525, 535, 536, 530

[56] References Cited

U.S. PATENT DOCUMENTS

| | | | |
|---|---|---|---|
| T890,013 | 9/1971 | Lawrence | 425/536 |
| 3,712,784 | 1/1973 | Siard et al. | 425/536 |
| 3,737,275 | 6/1973 | Kontz | 425/536 |
| 3,866,636 | 2/1975 | Lasater | 141/392 |
| 3,884,277 | 5/1975 | Rademacher et al. | 141/311 |
| 3,895,897 | 7/1975 | Hudson | 425/536 |
| 3,974,865 | 8/1975 | Fenton et al. | 141/311 R |
| 4,009,980 | 3/1977 | Armour et al. | 425/525 |
| 4,056,131 | 11/1977 | Healy | 141/392 |
| 4,070,141 | 1/1978 | Ryder | 425/535 |
| 4,196,759 | 4/1980 | McMath et al. | 141/311 R |
| 4,224,913 | 1/1981 | Ryder | 264/348 |
| 4,382,760 | 5/1933 | Wiatt et al. | 264/535 |
| 4,403,940 | 9/1983 | Krishnamumar | 425/535 |
| 4,412,806 | 11/1983 | Gaiser et al. | 425/525 |
| 4,422,843 | 12/1983 | Aoki | 425/525 |
| 4,456,447 | 6/1984 | Smith | 425/535 |

Primary Examiner—Willard E. Hoag
Attorney, Agent, or Firm—Barnes & Thornburg

[57] ABSTRACT

A nozzle assembly, for a blow-molding machine having a parison seal and an expansible chamber for biasing the nozzle seal into engagement with the lip of the parison about the parison opening.

8 Claims, 1 Drawing Figure

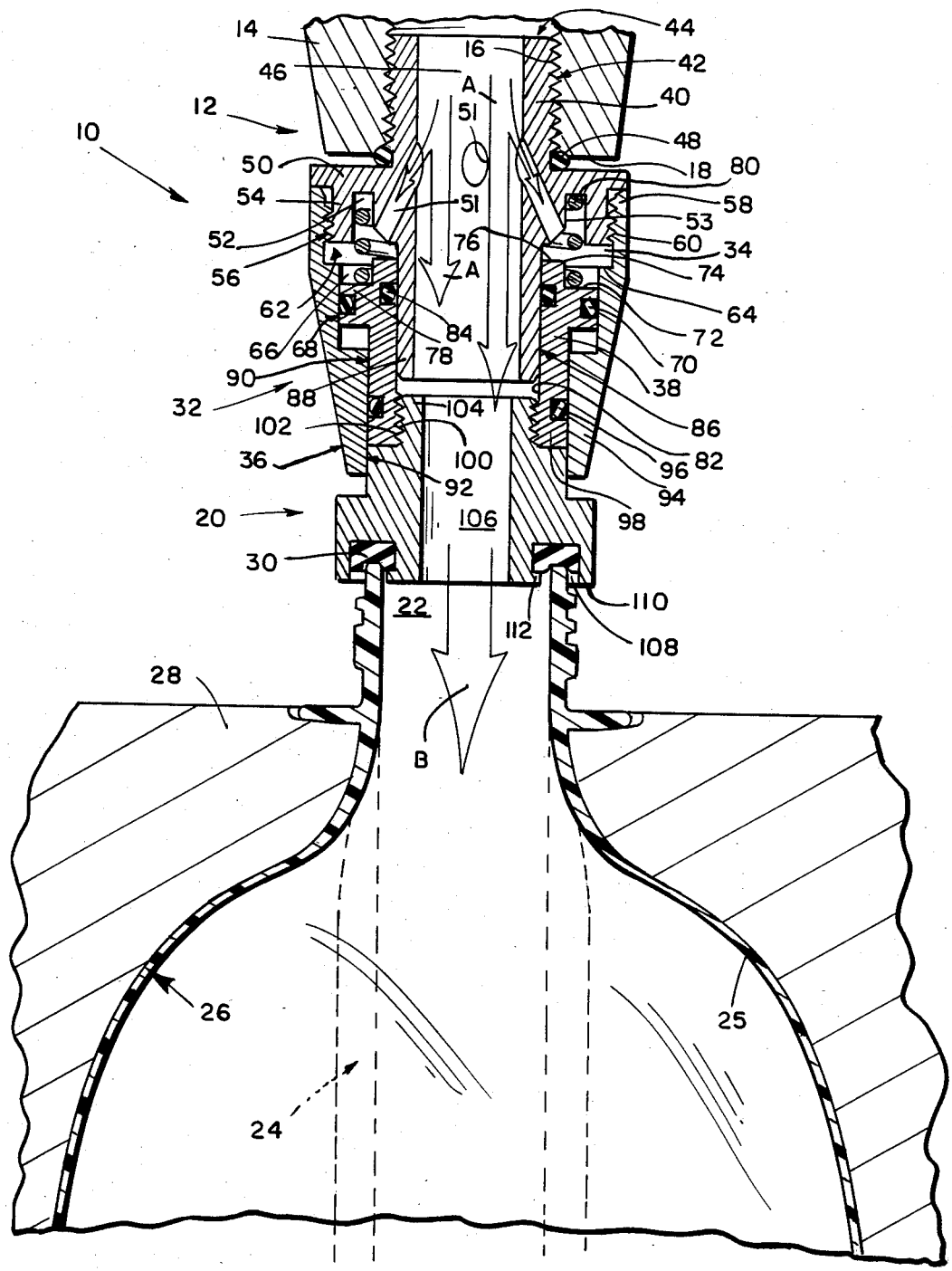

NOZZLE ASSEMBLY

The present invention relates to machines for blow molding of hollow plastic articles such as containers comprised of thermoplastic material.

Hollow thermoplastic containers have long been produced by the blowing of an extruded tube or preformed parison captured between two mold halves. The present invention has particular utility and is intended for use principally with the blow molding of preformed, and typically injection molded parisons.

Subsequent to the placement of a parison within a mold of a blow molding machine, a nozzle or blow pin is brought into contact with the neck opening which provides a conduit for the introduction of blow air into the interior of the captured parison. Blow air is then introduced through the nozzle or blow pin to inflate the captured parison to the shape of the mold. Conventionally, a tight frictional fit is maintained between the inside surface of the neck opening and the outside of the nozzle or blow pin so as to maintain a pressure seal during the blowing operation. While this frictional contact presents no significant problems so long as the nozzle or blow pin is without blemish, the presence of scratches or machining errors on the nozzle or blow pin can easily be transferred to the inside surface of the neck opening during the blowing operation.

The transfer of minor blemishes or machining imperfections by mechanical abrasion during the blowing process presents no problem so long as the closures being employed with the containers thus formed include a soft deformable seal. With the increasing use of one piece molded plastic caps such as those disclosed in U.S. Pat. Nos. 4,111,322; 4,161,258; and 4,345,692 the presence of any blemishes has become a great detriment. The one piece molded plastic caps typically include an inner seal which contacts the inside surface of the neck immediately below the lip of the container. Imperfections and in particular vertical scratches even one or two-thousandths of an inch is depth are sufficient to permit the gas of a bottled carbonated beverage to escape past the seal, which is of course totally unsatisfactory.

Therefore, it is an object of the present invention to provide a nozzle assembly for a blow molding machine which can achieve a gas tight contact with the neck opening of a container during the blow molding thereof and which will not abrade or scratch the inner lip surface of the container thus formed.

In accordance with this object, a nozzle assembly of the present invention has been constructed for blow molding machines for introducing a pressurized gas into an opening of a parison to conform the parison to the shape of the mold. The nozzle assembly comprises generally a connecting means for attachment to an outlet of pressurized gas on the blow molding machine, a contacting means for contacting the opening of the parison including a seal means for preventing the escape of pressurized gas, and means defining an expansible chamber between the connecting means and contacting means for ensuring engagement between the contacting means and the parison opening. In the preferred embodiment, the seal means comprises an elastomeric ring adapted to contact a top annular surface defining the opening of a parison. The elastomeric ring is captured within an annular recess surrounding a central opening in a nosepiece. The nosepiece is secured to the lower end of an annular piston received in an annular chamber. The annular chamber is defined by a stem threadably connected to the blow molding machine having a downwardly extending sleeve and a circumferential cuff surrounding the sleeve. A plurality of ports lead to the expansible chamber from a central opening extending longitudinally through the stem. Further, means are provided for biasing the piston within the chamber to a lower position so as to provide an initial contact between the seal and the upper surface of the parison lip.

One feature of the present invention is the presence of inclined ports between the central stem passage and the surrounding annular chamber. The inclined ports function to direct the incoming high pressure blow gas toward the expansion chamber before the gas pressure within the parison has an opportunity to build to any significant level thereby pneumatically forcing the elastomeric seal in secure contact with the upper lip of the parison.

Another feature of the nozzle assembly of the present invention is the sleeve portion of the stem having a lengthwise dimension sufficiently long as to provide a continuous inner bearing surface for the annular piston within the expansible chamber yet sufficiently short as to provide for slight variations in the height of the lip on the parison finish and thereby avoid any compression deformation of the finish which could detrimentally affect the seal surface.

Additional features and advantages of the invention will become apparent to those skilled in the art upon consideration of the following detailed description of a preferred embodiment exemplifying the best mode of carrying out the invention as presently perceived. The detailed description particularly refers to the accompanying FIGURE in which the nozzle assembly is shown in section contacting the upper lip surface of a bottle situated within a blow mold.

A nozzle assembly 10 is shown in the accompanying FIGURE to consist generally of a connecting means 12 which connects the assembly to an outlet 14 of pressurized gas. In a typical blow molding machine, four such outlets are provided linearly adjacent to each other and adapted for reciprocal motion above four adjacent blow molds. An appropriate nozzle assembly such as that illustrated can be engaged on the outlet or stem support 14 by means of threads 16 for other equivalent engaging features adjacent a lower end 18 of the outlet.

The nozzle assembly 10 further includes a contacting means 20 for contacting the opening 22 of the parison 24 which is illustrated in phantom prior to the blowing operation and as a bottle 25 conforming to the interior surface 26 of mold 28. The contacting means 20 includes a seal means 30 for preventing the escape of pressurized gas during the blowing operation.

The nozzle assembly 10 further includes between the connecting means 12 and the contacting means 20 means 32 defining an expansible chamber 34 for ensuring engagement between the contacting means 20 and the parison opening 22. The expansible chamber 34 is defined by a first member 36 having an inner surface which defines an outer wall of the chamber 34 and a second member 38 which defines a piston movable with respect to member 36 so as to change the volume of the expansible chamber 34.

The connecting means 12 is seen to include a stem 40 having a threaded outer surface 42 on its upper end 44. The threaded surface 42 is adapted to engage the threaded surface 16 of stem support 14. A major axial passageway 46 extends downwardly through the center of the stem 40 toward the parison 24. Air or other pressurized gas emanating from the outlet 14 passes through the passageway 46 as shown by arrows A. An O-ring or other appropriate seal 48 can be positioned at the base of the threaded surface 42 to prevent the unwanted escape of gas between the stem support 14 and the stem 40.

At the base of the threaded portion 42 of stem 40 is a radially outwardly extending flange 50. The flange includes on a lower surface an annualr channel 52 surrounded by a depending wall 54 having a threaded outer surface 56. The wall 54 and channel 52 form the upper annular surface of the expansible chamber 34. Downwardly angled ports 51 extend from axial passageway 46 through inner wall 53 into the chamber 34. The expansible chamber 34 is further defined by cuff 36 which is secured at its upper end 58 to flange 50 by threads 60 engaging the threads 56 of the depending wall 54. An inside surface 62 of cuff 36 defines the outer wall of expansible chamber 34.

The inside surface 62 of cuff 36 includes a step 64 between a larger diametered upper portion containing thread 60 and a smaller diametered lower portion 66 which is right cylindrical in shape and provides a smooth mating surface for the radially outer surface 68 of piston 38. The piston 38 includes in its outermost surface 68 a seal 70 shown as a channel containing an O-ring. The uppermost surface 72 of piston 38 includes a step 74 separating a radially inward upper portion 76 from the radially outward lower portion 78.

A compression spring 80 is arranged to extend between channel 52 on the lower surface of flange 50 and the radially outer portion 78 of upper surface 72 of piston 38. The spring 80 biases the piston 38 toward a lower position and is intended to ensure initial contact between the seal means 30 and the upper lip of opening 22 of parison 24.

The piston 38 includes a smooth cylindrical inner surface 82 which includes a seal 84 shown again to be an O-ring within a channel which is slidably engaged on an outer surface 86 of the lower portion 88 of stem 40. A lower outer surface 90 defining a skirt of piston 38 having a smaller diameter than outermost surface 68 of piston 38 is slidably engaged with inner surface 92 on the lower portion 94 of cuff 36. Surface 90 of piston 38 includes yet another seal 96 shown again as a channel containing an O-ring.

At the lower end 98 of inner surface 82 on the piston skirt, threads or other engaging elements 100 are provided which cooperatively engage with mating elements 102 on an upper end 104 of the contacting means 20. The contacting means 20 is shown to further include a central axial bore 106 which directs air received from the bore 46 of stem 40 into the open mouth 22 of parison 24 as shown by arrow B. The seal means 30 is included within an annular channel 108 on lower surface 110 of the contacting means 20. The annular channel 108 includes an inner lip 112 which acts to retain the seal within the channel.

The seal means 30 is preferably an elastomeric polymer having a durometer of between about 40 and 100 Shore A. A particularly usable material is GE RTV silicone which can be cast in the annular channel with the contacting means in a position inverted from that illustrated.

In operation, after the parison has been situated within the mold 28, the nozzle assembly is caused to descend by vertical motion of stem support 14 until the seal means 30 contacts the upper lip of opening 22 of the parison 24. The lower extent of motion of the stem support 14 is preferably adjusted such that the contacting means 20 and hence piston 38 moves upwardly with respect to stem 40 and cuff 36 through approximately one-half or more of the free travel. In a typical installation, a variation of up to one-quarter of an inch can be tolerated. In general, parisons are formed with sufficient regularity that variations are generally less than about ten-thousandths of an inch.

After the seal 30 has contacted the upper lip of the parison 24 and the piston 38 moved upward against the biasing force of spring 80, a gaseous blowing medium, typically air, is quickly injected through outlet 14 and into axial passageway 46. The downwardly angled ports 51 extending from the axial passageway 46 through the inner wall 53 of chamber 34 causes a quick increase in pressure within the chamber 34. This increase in pressure within chamber 34 exerts a force on the annular pressure surface 72 of piston 38 causing it to press downwardly to ensure a complete and full seal by the sealing means 30 on the upper lip of opening 22. As more blowing air continues through the axial passageway 106 of the contacting means 20, the pressure within the parison builds causing it to expand outwardly to conform to the walls 26 of mold 28 and form bottle 25.

At the end of the blowing cycle, the pressure within the nozzle assembly and blown bottle 25 is relieved through a relief valve, not shown, and the stem support 14 moved vertically upward so as to remove contact between the blown bottle 25 and the contacting means 20. The blown bottle 25 is then removed from the mold 28 and a new parison 24 situated therein ready for a repeat of the blowing cycle.

Although the invention has been described in detail with reference to the illustrated preferred embodiment, variations and modifications exist within the scope and spirit of the invention as described and as defined in the following claims.

What I claim is:

1. A nozzle assembly of a blow molding machine for introducing a pressurized gas into an opening of a parison to conform the parison to the shape of a mold, the nozzle assembly comprising: connecting means for attachment to an outlet of pressurized gas, contacting means for contacting the opening of the parison including a deformable seal means for preventing the escape of pressurized gas, and means defining an expansible chamber between the connecting means and the contacting means for ensuring engagement between the contacting means and the parison opening.

2. The nozzle assembly of claim 1 wherein the seal means comprises an elastomeric ring adapted to contact a top annular surface defining the opening of a parison.

3. The nozzle assembly of claim 1 wherein said means defining an expansible chamber comprises a first member defining an outer wall of the chamber, and a second member defining a piston movable with respect to the first member to change the volume of the expansible chamber.

4. The nozzle assembly of claim 3 wherein the first member comprises a cylindrical cuff fixed to an outer periphery of the connecting means, the cuff including a radially inward step limiting the extent of travel of the second member.

5. The nozzle assembly of claim 3 wherein the second member comprises a skirt received between the connecting means and the first member, the skirt having a lower end connected to the connecting means and an upper end defining an annular pressure surface adapted to respond to gas pressure within the expansible chamber.

6. The nozzle assembly of claim 3 further comprising biasing means for biasing the second member toward a position wherein the expansible chamber is at its largest volume.

7. The nozzle assembly of claim 1 further comprising spring biasing means for biasing the contacting means toward an initial parison contact position.

8. The nozzle assembly of claim 3 wherein said additional passageway comprises a plurality of inclined ports for directing an initial gas pressure front toward a movable surface within said expansible chamber.

* * * * *